(No Model.) 2 Sheets—Sheet 1.

T. D. PEASLEY.
FILTER.

No. 535,295. Patented Mar. 5, 1895.

WITNESSES:
E. C. Duffy
Chas. M. Werle

INVENTOR
T. D. Peasley
BY
O. E. Duffy
ATTORNEY.

(No Model.) 2 Sheets—Sheet 2.

T. D. PEASLEY.
FILTER.

No. 535,295. Patented Mar. 5, 1895.

WITNESSES:
E. C. Duffy
Hubert E. Peck

INVENTOR
T. D. Peasley
BY O. E. Duffy
ATTORNEY.

UNITED STATES PATENT OFFICE.

THOMAS D. PEASLEY, OF BLOOMINGTON, ILLINOIS.

FILTER.

SPECIFICATION forming part of Letters Patent No. 535,295, dated March 5, 1895.

Application filed March 8, 1894. Serial No. 502,850. (No model.)

*To all whom it may concern:*

Be it known that I, THOMAS D. PEASLEY, of Bloomington, in the county of McLean and State of Illinois, have invented certain new and useful Improvements in Filters; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in filters.

Great difficulty is usually experienced in operating portable engines because the water for the boilers often has to be drawn from streams, ponds or bodies of stagnant water containing quantities of sand, dirt, floating particles and trash, and the traveling or portable tanks in which said water is stored for immediate use are so jarred and shaken in passing over rough roads that the dirt, sediment, &c., is kept stirred up in the water and passes into the engine boiler thereby clogging the same rendering it dangerous to operate and very hard to fire, and also this sediment and trash render pumps and injectors almost if not entirely inoperative. It is the object of this present invention to provide improved means carried by said water tank or elsewhere arranged in the water supply conduit to remove such sediment, dirt, &c., from the water and purify the water so that injectors or pumps can be used with satisfaction and the necessity of frequent boiler washings will be obviated.

The invention consists in certain novel features of construction and in combinations and arrangements of parts more fully and particularly described and pointed out hereinafter.

Figure 1:
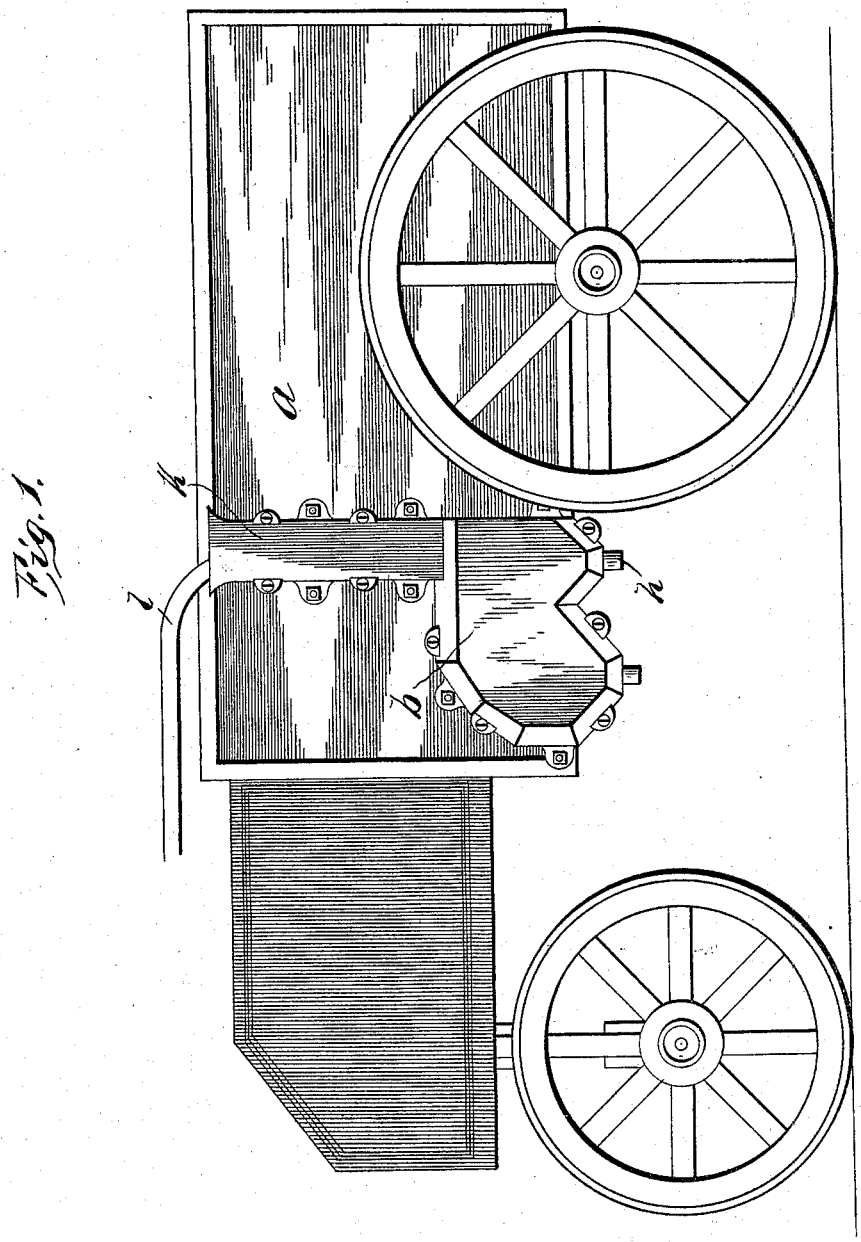
Figure 2:
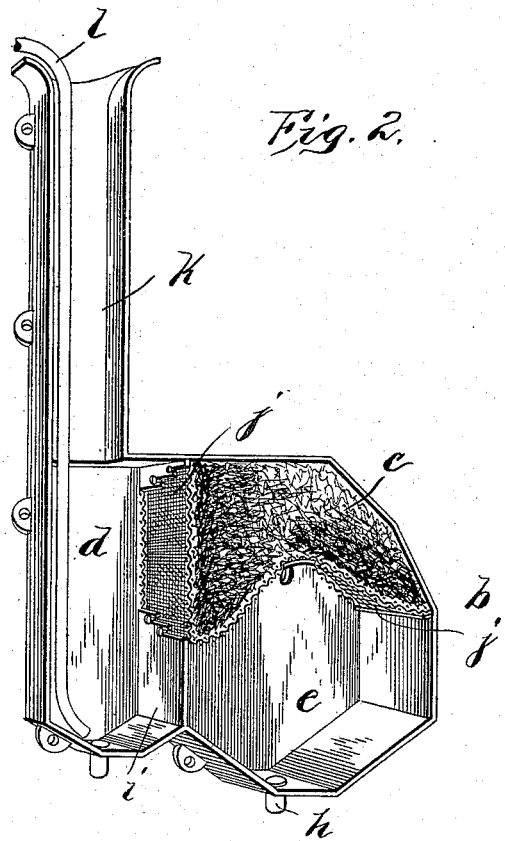
Figure 3:
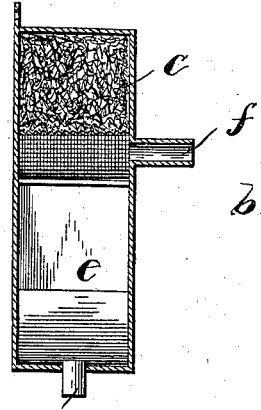

Referring to the accompanying drawings, Figure 1, shows a portable water tank provided with the improved filter of the present invention. Fig. 2, is a view of the filter in perspective with one side thereof removed to show the interior arrangement. Fig. 3, is a vertical sectional view.

In the drawings $a$, is a portable water tank of any suitable or ordinary construction. The filter —$b$— is suitably secured to this tank, preferably being secured to the exterior thereof by means of bolts, screws or the like. This filter has a suitable casing, being usually cast with one side removable and suitably secured so as to form a tight joint. The interior of the casing is suitably divided into a settling compartment into which the water from the tank directly flows; a filtering compartment —$c$— arranged, usually, directly above the settling compartment and filled with some suitable and desirable filtering material, as tightly packed excelsior; and the filtered water compartment —$d$— usually although not necessarily, arranged at one end of the casing beside the settling compartment —$e$— and the filtering compartment —$c$—.

The filter is so secured to the water tank that the settling compartment —$e$— is located in a plane below the bottom of the filter, and so that the discharge pipe —$f$— from the bottom of the water tank enters the settling compartment —$e$— at the top thereof and just below the filtering chamber. Thus all the sediment can pass off from the tank without accumulating therein.

The floor of the settling chamber preferably tapers or is inclined downwardly to a discharge nozzle or spout —$h$— from the lowest part thereof normally closed by a plug, whereby the collection of dirt, &c., can be easily discharged from said chamber by removing the plug.

$i$— is a vertical partition separating the settling and filtered water chambers and extending up a portion of the distance from the bottom of the casing to the top thereof, and preferably although not necessarily formed integral with the casing.

$j$—$j$— are the reticulated walls usually secured to the upper portion of said partition and extending upwardly to the top of the casing to retain the filtering material from the filtered water chamber, and laterally to the side of the casing over the settling chamber to retain the filtering material from the settling chamber.

$k$— is an upward extension of the filtered water chamber to receive and support the pipe (usually a hose pipe) extending to the pump or injector which draws the water from the filtered water chamber and forces it into the boiler. This pipe —$l$— to the pump passes down the extension —$k$— and into the lower part of the vertical filtered water chamber so that it is always under water at its suction end while there is water in the chamber no matter how roughly the water in the tank is jolted around.

The filtered water chamber can have a bottom opening and plug if desired.

It will be observed that the water flowing into the settling chamber descends and at the same time there is a suction from said chamber through the filtering chamber so that the water in said settling chamber is kept twirling and in motion thereby preventing the reticulated wall clogging with sediment. The filtering material removes all floating foreign substances held in the water not precipitated in the settling chamber and the water in the filtered water chamber is in good condition for the boiler for generating steam without choking up the boiler.

$m$— indicates an intermediate support for the reticulated wall above the settling chamber.

It will be observed that this filter can be attached to boilers or any water tank or it can form a part of a water channel or conduit.

It is evident that various changes might be made in the forms, arrangements and constructions of the parts described without departing from the spirit and scope of this invention. Hence I do not wish to limit myself specifically.

What I claim is—

1. The herein described filter comprising the casing flat on one side and formed to be secured against the side of a tank, said tank having the settling chamber on one side of its bottom, the lateral inlet from the tank into the upper part of said chamber, the filtering chamber in the upper part of the casing directly above the settling chamber so that the water flows up therefrom through the filtering chamber, and the filtered water chamber in one end of the casing beside said two previously mentioned chambers, the filtering chamber having a side outlet into said filtered water chamber, substantially as described.

2. The herein described filter comprising the casing having the internal vertical partition $i$, extending up from the bottom of the casing a part of the way to the top thereof, reticulated material extending from the partition to the top of the casing and laterally from the partition to one side of the casing, the chamber thus formed containing filtering material, an inlet opening into the chamber beside the partition and beneath the filtering material and the upward open extension from the chamber beside the partition and filtering material, as set forth.

In testimony that I claim the foregoing as my own I affix my signature in presence of two witnesses.

THOMAS D. PEASLEY.

Witnesses:
CHAS. M. PEIRCE,
A. W. PEASLEY.